United States Patent [19]

Murib

[11] Patent Number: 4,871,516
[45] Date of Patent: Oct. 3, 1989

[54] APPARATUS AND METHOD FOR CONDUCTING CHEMICAL REACTIONS

[75] Inventor: Jawad H. Murib, Cincinnati, Ohio

[73] Assignee: National Distillers and Chemical Corporation, New York, N.Y.

[21] Appl. No.: 206,979

[22] Filed: Jun. 13, 1988

Related U.S. Application Data

[63] Continuation of Ser. No. 31,828, Mar. 30, 1987, abandoned.

[51] Int. Cl.$^4$ .............................................. B01J 10/00
[52] U.S. Cl. ................................. 422/189; 261/121.1; 422/193; 422/194; 422/229; 422/231; 570/244; 585/500
[58] Field of Search ................ 585/500, 943; 570/244, 570/261; 423/DIG. 12; 422/189, 193, 194, 195, 229, 231; 55/255, 256; 366/102, 344; 261/121.1, 123

[56] References Cited

U.S. PATENT DOCUMENTS

| | | | |
|---|---|---|---|
| 2,996,287 | 8/1961 | Audran | 261/121.1 |
| 3,721,530 | 3/1973 | Bouchet | 422/231 |
| 3,969,490 | 7/1976 | de Beuckelaer et al. | 423/DIG. 12 |
| 4,643,972 | 2/1987 | Young | 422/227 |

Primary Examiner—Joye Woodard
Attorney, Agent, or Firm—Kenneth D. Tremain

[57] ABSTRACT

An apparatus for conducting sequential chemical reactions between two gaseous reactants and a liquid reaction medium wherein contact between the two gaseous reactants are to be avoided is disclosed. The apparatus comprises a first reaction zone provided with means for contacting a first gaseous reactant with a liquid reaction medium to provide an intermediate liquid mixture, a second reaction zone provided with means for contact between a second gaseous reactant and said intermediate liquid mixture to form a product, communication means providing communication for said liquid reaction medium and said intermediate liquid mixture between said first and second reaction zones and circulation means for continuously circulating said liquid reaction medium and said intermediate liquid mixture between said first and second reaction zones.

7 Claims, 4 Drawing Sheets

APPARATUS AND METHOD FOR CONDUCTING CHEMICAL REACTIONS

This application is a continuation of application Ser. No. 031,828, filed Mar. 30, 1987, now abandoned.

BACKGROUND OF THE DISCLOSURE

1. Field of the Invention

The present invention is directed to an apparatus for conducting chemical reactions. More specifically, the present invention is directed to an apparatus which provides contact between a first gaseous reactant, a second gaseous reactant and a liquid reaction medium without intimate contact between the two gaseous reactants.

2. Background of the Prior Art

Many apparatus have been developed to permit gas-liquid contact. These apparatus are generally utilized in mass transfer operations between a gas and a liquid or to effectuate a chemical reaction between a gas and a liquid.

Oftentimes these gas-liquid contact type apparatus utilize a loop design. In such designs the principal means for providing fluid motion about the loop is bulk fluid density variations caused by the introduction of the gas into the liquid. Typically, in these loop-type gas-liquid contact apparatus, design variations usually involve the means by which the gas and liquid phases are separated after mass transfer, chemical reaction or the like has taken place.

Many such gas-liquid contact apparatus are known in the art. For example, U.S. Pat. No. 3,487,621 discloses a gas-liquid contact apparatus, which may include a solid material in suspension, which permits contact between gas and liquid without the assistance of any rotating part. This design allows only for a single gas to contact a single liquid.

U.S. Pat. No. 3,957,442 provides an apparatus for the production of glycerol dichlorohydrin. The design of this apparatus involves the introduction of two dissimilar gases into an aqueous liquid stream. However, the two gases, chlorine and allyl chloride, in effect, react with each other. Thus, while the apparatus of the '442 patent involves the use of two dissimilar gases, it does not provide means for keeping the gases from reacting with each other.

U.S. Pat. No. 4,342,876 is directed to an induced circulation reactor which permits the oxidation of p-xylene and p-methyltoluate with air in the presence of a catalyst to produce p-toluic acid and monomethylterephthalate. Although the design of this apparatus represents a classical "loop" reactor, only one gas is involved in the reaction scheme, an oxygen-containing gas, preferably air. The air causes circulation of the reaction medium through the loop by reducing the bulk density of the liquid reaction medium in the first column of the two vertical column loop reactor.

A particular problem associated with chemical reactions involving mixed multiple gaseous reactants such as oxygen and organic compounds is the need to insure that the concentration of each gas is within specified safety limits, i.e., outside the explosive zone, depending on the organic compound employed. Any attempt to operate inside the explosive zone can lead to a violent explosion. Generally, operation outside safety limits can also lead to undesirable side reactions.

Since oxygen and organic compounds are extensively employed together as feed stocks in numerous industrially important processes, it is apparent that new apparatus need be developed to allow such processes to be carried out more efficiently and with greater safety than in the past.

The above remarks establish the need in the art for a reactor system which permits contact between two gaseous reactants and a liquid reaction medium but which prevents intimate contact between the two gaseous reactants.

SUMMARY OF THE INVENTION

An apparatus has now been developed which permits gas-liquid contact between two gaseous reactants and a common liquid reaction medium without contact between the two gases. As a result, the apparatus permits a single liquid to contact two gases, which have the potential to chemically react, without any contact between the two gases.

In accordance with the present invention an apparatus is provided which includes a first reaction zone provided with means for contact between a first gaseous reactant and a liquid reaction medium whereby the first gaseous reactant reacts with the liquid reaction medium to form an intermediate liquid mixture. The apparatus further includes a second reaction zone, in communication with the intermediate liquid mixture, providing means for contact between a second gas and the intermediate liquid mixture whereby a product is formed and the liquid reaction medium regenerated. The apparatus also includes communicating means providing communication for said liquid reaction medium and said intermediate liquid mixture between said first reaction zone and said second reaction zone and circulating means for continuously circulating said liquid reaction medium and said intermediate liquid mixture between said first and second reaction zones without said first and second gaseous reactants contacting each other.

BRIEF DESCRIPTION OF THE DRAWINGS

The present invention may be better understood with reference to the accompanying drawings of which.

DETAILED DESCRIPTION

The apparatus of the present invention provides means by which a first gaseous reactant and a second gaseous reactant contact a common liquid reaction medium without contact between the two gases. Such apparatus find utility as reactors for chemical processes wherein the gases react with the liquid reaction medium, but are kept apart from each other. In addition, the apparatus of the present invention is designed so that the difference in flow rates of the gases can define the flow rate and direction of the liquid in the apparatus. That is, the gases introduced into the individual reaction zones affect the bulk density such that the flow rate and direction of the liquid can be controlled accordingly. Alternatively, a rotating device containing one or more fins or propellers disposed in at least one of the reaction zones may be employed to regulate the rate and direction of flow of the liquid reaction medium. The apparatus of the present invention also contemplates the embodiment wherein both means of flow controlling means are utilized. Other aspects of the apparatus, peripheral to these main functions, are provided in the several embodiments disclosed herein.

The basic embodiment of the apparatus of the present invention includes a first reaction zone; a second reaction zone; means for circulating the liquid reaction medium between the two reaction zones; inlet means for introducing a first gaseous reactant and a second gaseous reactant into first and second reaction zones, respectively; and outlet means for reactant effluents and product recovery.

Figure 1:
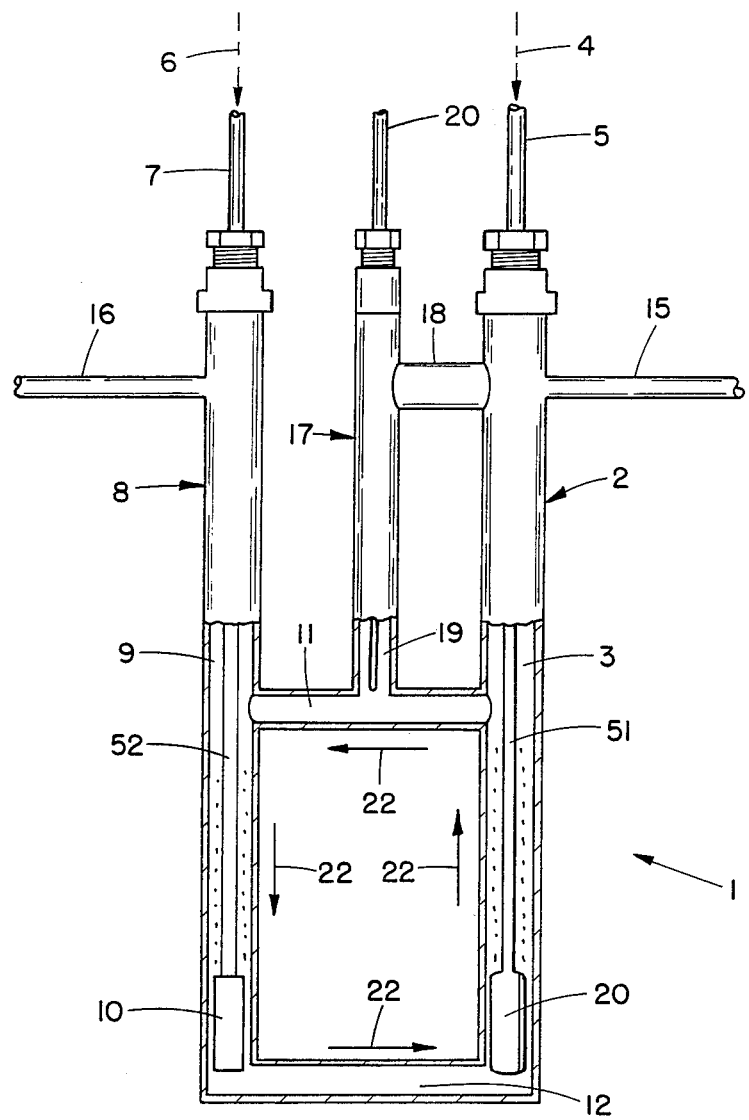
FIG. 1 is a schematic representations of a first embodiment of the apparatus of the instant invention.

FIG. 1 schematically depicts an apparatus 1 provided with a first reaction zone generally indicated at 2 made up of a vertical conduit 3 in communication with a first gas inlet means designated by reference numeral 5 through which a first gaseous reactant 4 is introduced into the first vertical conduit 3. The first gas inlet means 5 comprises tubular member 51 terminating at its downstream end in a first gas diffuser 20. It is noted that in FIG. 1, and the figures that follow, the first gaseous reactant is depicted by arrow 4.

A second gaseous reactant, depicted in all the figures by arrow 6, is introduced through a second gas inlet means 7 into the second reaction zone, generally indicated by reference numeral 8. The second reaction zone 8 comprises a second vertical conduit 9, in which a gas diffuser 10 is disposed in communication with the gas inlet means 7 in a manner analogous with the communication between first gas inlet means 5 and diffuser 20. That is, gas 6 flows through a tubular member 52 and contacts the liquid disposed in conduit 9 after passing from tube 52 into the diffuser 10.

Communication between the first reaction zone 2 and the second reaction zone 8 is provided by communication means consisting of upper and lower horizontal liquid communication conduits 11 and 12, respectively, which provide fluid communication between first and second vertical conduits 3 and 9 of the first and second reaction zones 2 and 8, respectively.

The apparatus is also provided with first and second gaseous reactant outlet means 15 and 16, respectively. The outlet means 15 and 16 are utilized to remove non-reacted first gaseous reactant 4 and second gaseous reactant 6, respectively, as well as, in the case of second gaseous reactant outlet means 16, gaseous products from the apparatus 1. In apparatus 1 outlet means 15 and 16 are provided by gas vents.

An optional feature present in apparatus 1 is vertical conduit 17, itself provided with outlet means 18, a vent, to remove any excess gaseous reactant that makes its way into conduit 17. It is noted that outlet means 18 is in communication with first gaseous reactant outlet means 15. Vertical conduit 17 finds utility, in the embodiment illustrated by apparatus 1, as a means for measuring temperature. Thus, conduit 17 includes a thermocouple well 19 in which a thermocouple 23 is disposed.

In operation, a liquid reaction medium is disposed in the first and second reaction zones 2 and 8. Obviously, communication provided between first and second conduits 3 and 9 by the upper and lower horizontal liquid communication conduits 11 and 12 results in liquid filling all four conduits. The first gaseous reactant 4 is introduced into vertical conduit 3 through inlet means 5. Similarly, the second gaseous reactant 6 is introduced into vertical conduit 9 through inlet means 7. The relative feed rate of the two gaseous streams dictates the direction and flow rate of the liquid reaction medium therein. Arrows 22 illustrate the situation wherein the liquid flow moves counterclockwise in conduits 3, 9, 11 and 12. This situation occurs when the inlet feed rate of the first gas 4 exceeds the inlet gas feed rate of the second gas 6. The greater flow rate of first gas 4 causes the fluid bulk density in vertical conduit 3 to be less than that in vertical conduit 9 which, in turn, effects upward movement of the fluid in vertical conduit 3 and downward movement in the vertical conduit 9 creating the counter-clockwise flow. The first and second gas outlet means 15 and 16 are employed to remove excess gaseous reactants 4 and 6 as well as resultant product gas from the chemical reactions that occur in reaction zones 2 and 8.

Figure 2:
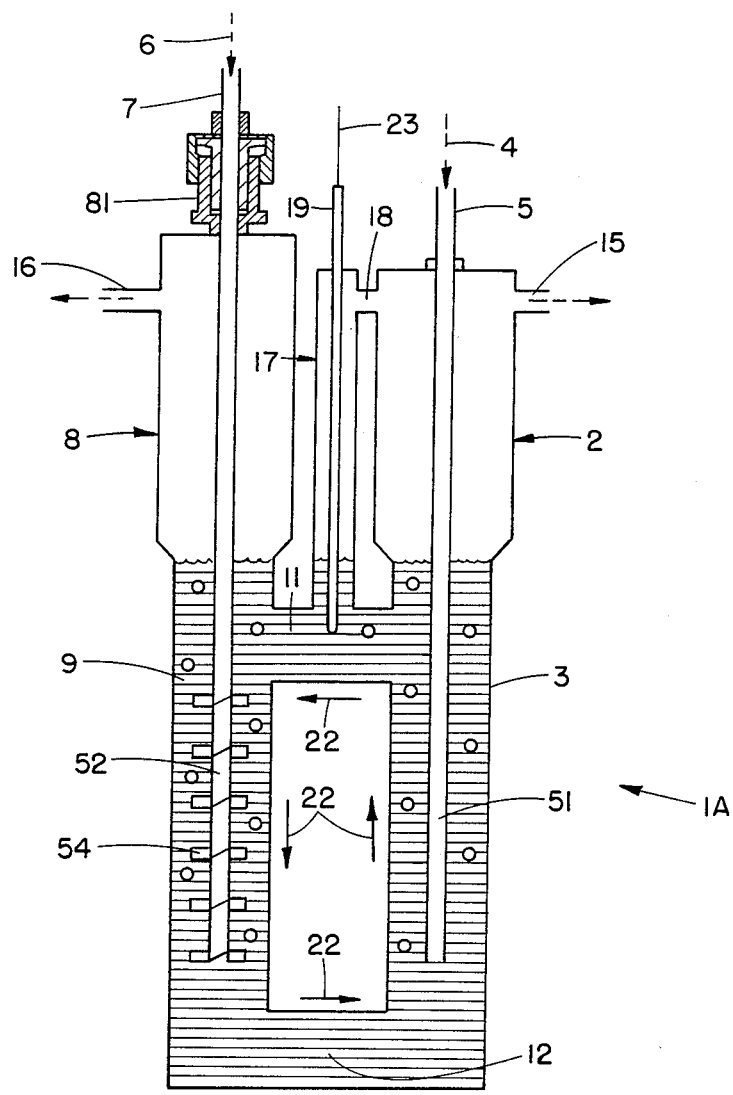
FIG. 2 is a schematic representation of a second embodiment of the apparatus of the instant invention.

A modification of the preferred embodiment of the present invention, apparatus 1, depicted in FIG. 1, is provided by apparatus 1A, schematically represented in FIG. 2. Apparatus 1A is identical with apparatus 1 in all but one significant respect. Therefore, reference numerals designating components thereof are identical to the extent that these elements coincide.

The difference between these preferred embodiments lies in the inclusion, in the embodiment illustrated by apparatus 1A, of an alternate means for effecting gas-liquid contact. In apparatus 1A, a stirrer, comprising a plurality of impellers 54 attached to tubular member 52, provides this function. In that hollow tubular member 52 rotates, a gas seal 81 is provided to prevent leakage. While this component provides both gas inlet and gas-liquid contact functions, these two functions could also be provided by separate elements. That is, an impeller could be provided independent of the inlet conduit.

Figure 3:
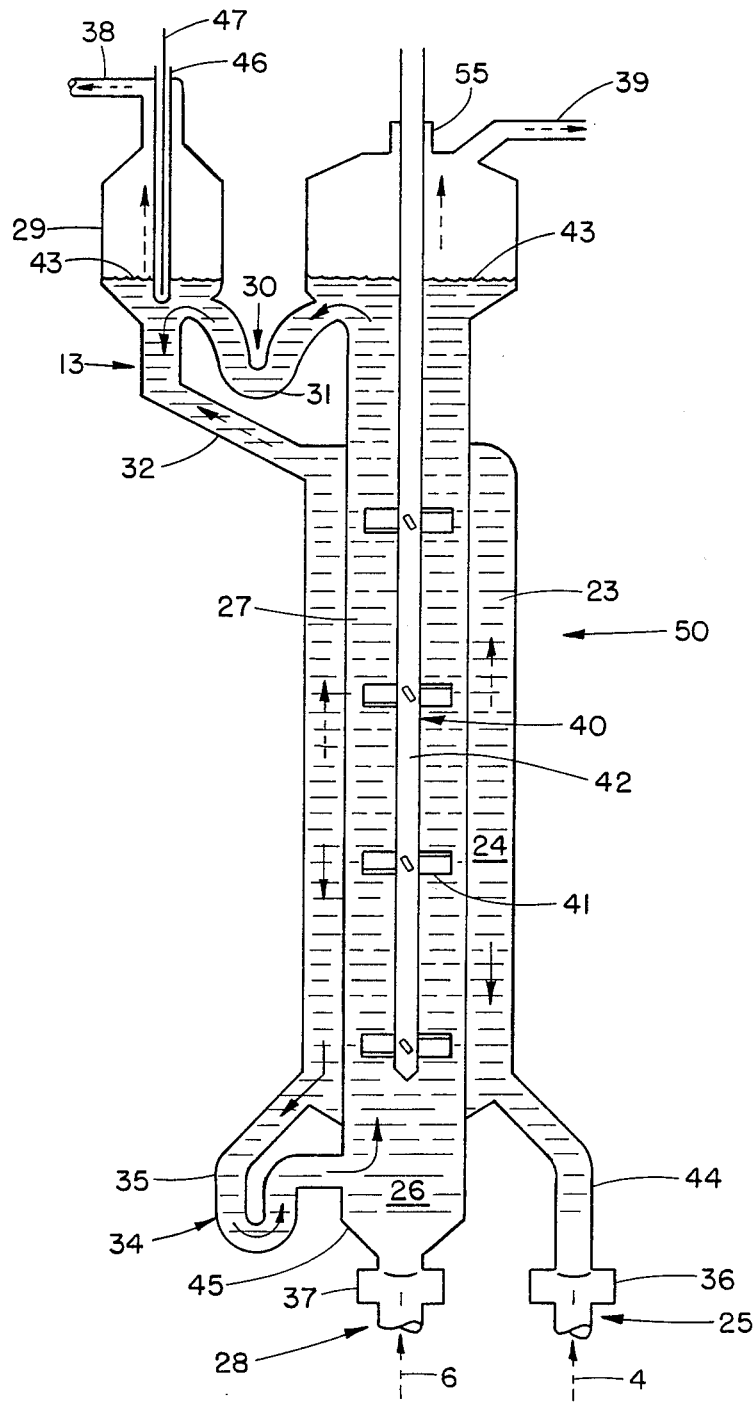
FIG. 3 is a schematic representation of a third embodiment of the apparatus of the instant invention.

FIG. 3 depicts an apparatus 50, another embodiment of the apparatus within the contemplation of the present invention. In apparatus 50 a first reaction zone 24 concentrically surrounds a second reaction zone 26. The first reaction zone 24 comprises a first vertical conduit 23, a first gas inlet means 25, in communication with conduit 23, through which the first gaseous reactant 4 is introduced into apparatus 50. First gas inlet means 25 includes a check valve 36 and a gas diffuser 44. The second reaction zone 26 comprises a second vertical conduit 27 concentrically surrounded by first conduit 23. The second conduit 27 communicates with a second gas inlet means 28 through which the second gaseous reactant 6 is introduced into the apparatus 50. Again, second gas inlet means 28 incorporates a check valve 37 and a gas diffuser 45.

An upper communication means, generally indicated at 30, provides liquid communication between the first reaction zone 24 and the second reaction zone 26. Upper communication means 30 is provided by an upper communicating conduct 13 which includes reservoir 29, a "U" shaped conduit 31, which provides fluid communication between second vertical conduit 27 and reservoir 29, and conduit 32, providing communication between reservoir 29 and first vertical conduit 23.

Lower communication means, generally indicated by reference numeral 34, provides fluid communication between first vertical conduit 23 and second vertical conduit 27 by a lower communicating conduit 35 which in apparatus 50 comprises a "U" shaped tube.

Apparatus 50, provided with first and second gaseous reactants inlet means 25 and 28 through which first gaseous reactant 4 and second gaseous reactant 6 are introduced into first conduit 23 and second conduit 27, respectively, incorporates, as stated above, check valves 36 and 37, to prevent the liquid reaction medium from flowing back into first gaseous inlet means 25 and second gaseous inlet means 28, respectively. In addition, first gas diffuser 44 and second gas diffuser 45 are disposed downstream of the valves 36 and 37, respectively as gas-liquid contact improving means.

Apparatus 50 is further provided with first outlet means 38 and second outlet means 39, which, as in the case of apparatus 1, are gas vents. First and second gaseous reactants outlet means 38 and 39 provide means for removal of unreacted gases 4 and 6, respectively, as well as any gaseous product through second gaseous reactant outlet means 39.

Apparatus 50 is provided with additional gas-liquid contact improving means with the inclusion of multivaned propeller 40 supplementing the gas-liquid contacting effect of gas diffuser 45 discussed above. The propeller 40 includes a smooth rotating cylinder 42 provided with a plurality of vanes 41. When the multivaned propeller 40 is activated by a source of power (not shown), it rotates and disperses and breaks up large gas bubbles. The dispersed, smaller bubbles enhance gas-liquid contact. In addition to its gas-liquid contact function, the propeller 40 can, as those skilled in the art of fluid flow are aware, dictate the direction of liquid flow in apparatus 50. Thus, the propeller provides flow direction control means as well as its gas-liquid contact improving function.

Apparatus 50 may also be provided with additional features depicted in the drawing such as a thermowell 46 fitted with a thermocouple 47 for measurement and control of reaction temperature. In addition, a gas seal 55 insures against gas leakage through the opening in apparatus 50 provided to accomodate rotating cylinder 42.

In operation, the apparatus 50 contains a liquid reaction medium filled to the level indicated by 43. The first gaseous reactant 4 is introduced into the first reaction zone 24 by way of first gas inlet means 25, passing through check valve 36 and diffuser 44. The diffused gas 4 proceeds upward through the liquid medium and any unreacted gas passes into reservoir 29 and is vented through outlet means 38.

The second gaseous reactant 6 is introduced into the second reaction zone 26, specifically into vertical conduit 27, by means of gas inlet means 28 thus flowing through check valve 37 and being diffused through diffuser 45. The diffused gas 6 proceeds upward through the liquid medium aided by the rotation of the propeller 40. Any gaseous reaction product and unreacted second gaseous reactant 6 are vented through outlet means 39 and recovered. It is noted that preferred flow of the gases and liquid in apparatus 50 is illustrated by solid arrows which indicate liquid flow and dotted arrows which signify gaseous flow.

Figure 4:
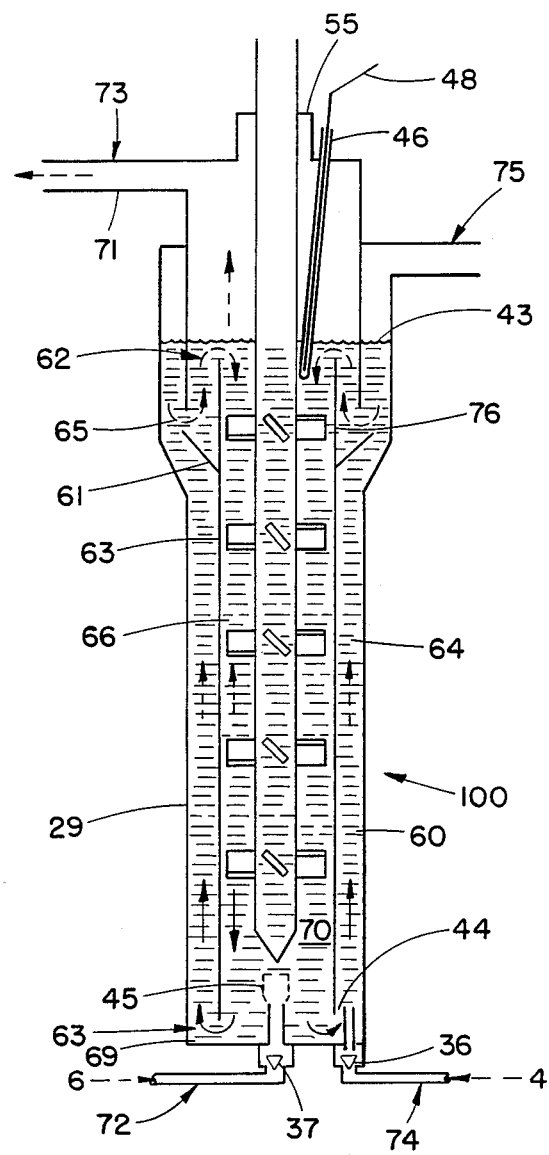
FIG. 4 is a schematic representation of a fourth embodiment of the apparatus of the instant invention.

Apparatus 100 of FIG. 4 is similar to apparatus 50. Apparatus 100, like apparatus 50, includes a first reaction zone 60 concentrically positioned about a second reaction zone 70. The basic distinction between apparatus 100 and apparatus 50 is in their respective upper and lower communication means. Whereas external conduit means are employed in both the upper and lower communication means of apparatus 50, apparatus 100 employs internal means, specifically upper and lower openings in common wall 63 dividing the first reaction zone 60 from the second reaction zone 70.

In particular, an upper communication means 62, is provided by a circular trough 61 positioned atop wall 63, which defines both the inner diameter of first vertical conduit 64 of the first reactor zone 60 and the outer diameter of second vertical conduit 66 of the second reactor zone 70, and an opening 65 provided between trough 61 and wall 71. The lower communication means, generally depicted by reference numeral 68, is formed by an opening 69 defined by the bottom of wall 63 and the outside wall 29 of the apparatus 100.

Apparatus 100 includes first and second gas inlet means, depicted in FIG. 4 at 74 and 72, respectively. First gas inlet means 74 includes a check valve 36 disposed upstream of a diffuser 44, as similarly provided in apparatus 50. Likewise, second gas inlet means 72 again includes check valve 37 and diffuser 45, located downstream of the valve 37. First and second gas inlet means 74 and 72 permit the introduction of first and second gaseous reactants 4 and 6, respectively.

In addition, a thermowell 46, accomodating thermocouple 48, permitting temperature measurement and control, and a gas seal 55, preventing gas leakage, are provided in apparatus 100.

In operation, first gaseous reactant 4 is introduced into the first reaction zone 60 of apparatus 100 through first gas inlet means 74 comprising check valve 36 and diffuser 44. The diffused first gaseous reactant 4 proceeds upward and reacts with the liquid reaction medium in conduit 64 of the first reaction zone 60. Any unreacted gas in vented through outlet means 75. Second gaseous reactant 6 is introduced into the second vertical conduit 66 of second reactor zone 70 through second gas inlet means 72, passing through check valve 37 and diffuser 45. Not only is gaseous reactant 6 dispersed by diffuser 45 but, in addition, a multivaned propeller 76 provides additional dispersal. The dispersed gaseous reactant 6 moves upward in conduit 66 reacting as it goes with the liquid reaction medium disposed therein. Gaseous reaction product and unreacted gas 6 is vented through second gas outlet means 78 out of apparatus 100 and recovered.

Communication between the liquid of the first reaction zone 60 and the liquid in second reaction zone 70 is provided by upper communication means 62 wherein liquid flow between the two reaction zones is accomodated through opening 65 defined by the wall 71 and the circular trough 61 and the lower communication means 68 wherein liquid flow between the two reaction zones is provided through opening 69 defined by wall 63.

Preferred operation of the apparatus 100 is again illustrated by the arrows defining fluid flow therein. The solid arrows indicate liquid flow and the dotted arrows depict first and second gaseous reactants flow, in the first and the second reaction zones, respectively.

The following examples are provided to illustrate the apparatus of the present invention. Because these examples are given for illustrative purposes only, the invention should not be limited thereto.

EXAMPLE 1

Use of Apparatus as a Loop Reactor in the Formation of Methyl Iodide

An apparatus of the type depicted in FIG. 1 (apparatus 1) was utilized as a loop reactor in the formation of methyl iodide from methane. In this reactor the first and second reaction zones, specifically formed by first and second vertical conduits 3 and 9, respectively, were constructed of two vertical 316 stainless steel pipes (1.6 cm ID by 30 cm length) connected by an upper and lower horizontal conduit. A powdered mixture of 225 g. lithium iodide; 5 g. lithium hydroxide; and 2 g. of 5 percent ruthenium supported on alumina was charged into the apparatus in increments and melted down at 700° C. The volume of melt formed was such that it filled the vertical conduits above the upper communicating horizontal conduit.

A gaseous mixture of 30 volume percent oxygen and 70 volume percent steam was bubbled into vertical conduit 9 through gas inlet 7. That is, the first gaseous reactant, as described in the detailed description above, was a mixture of oxygen and steam. This mixture was introduced into the apparatus at a rate of 90 cc/min.

Methane gas, which functions as the gas described hereinabove as the second gaseous reactant, was introduced through gas inlet 5 into vertical conduit 3, at a rate of 120 cc. per minute.

For the purpose of this example, gas inlets 5 and 7 were not equipped with diffusers.

The product of this reaction was removed through second gaseous reactant outlet means 15. The gaseous product of this reaction, as determined by gas chromotography and mass spectrometry analysis, indicated a carbon distribution in the gaseous product of 93 percent methyl iodide and 7 percent carbon dioxide. The methane conversion amounted to 24 percent per pass.

EXAMPLE 2

Use of the Apparatus as a Loop Reactor to Synthesize Hydrocarbons

The apparatus of FIG. 2 was utilized in the conversion of methane to produce hydrocarbons having at least two carbon atoms. In this process the apparatus, provided with a multi-vaned propeller in the methane side, that is, in conduit 9 in FIG. 2, was filled with a powdered mixture of 366 g. of lithium iodide; 7.7 g of lithium hydroxide; and 5.4 g of ruthenium iodide. The powdered mixture was added in increments and melted down at 700° C. The volume of the melt produced was such that it filled the vertical conduits denoted in FIG. 2 at 3 and 9 above the upper horizontal conduit 11.

A gaseous mixture of oxygen and nitrogen, each introduced into the apparatus at a rate of 12 cc/min, was fed into conduit 3. At the same time methane gas was introduced, through the hollow shaft 7 of the propeller, into conduit 9 at a rate of 24 cc/min.

Product analysis, by gas chromatographic and mass spectrometric means, indicated that the gaseous products consisted of 81 percent ethylene; 9 percent ethane; 3 percent propylene; 3 percent butadiene; and 4 percent carbon dioxide. Thus, the overall selectivity to higher hydrocarbons was 96 percent. The methane conversion rate was 5.3 percent per pass.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. An apparatus for conducting sequential chemical reactions, comprising:

a first vertical conduit having an interior for holding a liquid reaction medium;

a second vertical conduit having an interior for holding an intermediate liquid mixture;

gas injecting and liquid circulating means extending into the first and second vertical conduits to introduce a first gaseous reactant into the first vertical conduit, to introduce a second gaseous reactant into the second vertical conduit, and to circulate continuously the liquid reaction medium and the intermediate liquid mixture between the interiors of the first and second vertical conduits, wherein the first gaseous reactant reacts with the liquid reaction medium in the first vertical conduit to form said intermediate liquid mixture, and the second gaseous reactant reacts with the intermediate liquid mixture in the second vertical conduit to form a gaseous product;

communication means connected to both the first and second vertical conduits and in liquid communication with the interiors thereof to conduct the liquid reaction medium and the intermediate liquid mixture between the interiors of the first and second vertical conduits while maintaining the first and second gaseous reactants separated, and including (i) lower conduit means connected to and in fluid communication with the interiors of both the first and second vertical conduits, and (ii) upper conduit means connected to and in fluid communication with the interiors of both the first and second vertical conduits at a level above the lower conduit means;

a first gas vent connected to the first vertical conduit in fluid communication with the interior thereof to vent unreacted first gaseous reactant therefrom; and a second gas vent connected to the second vertical conduit in fluid communication with the interior thereof to vent unreacted second gaseous reactant therefrom;

the gas injecting and liquid circulating means including (i) means extending into the first vertical conduit to conduct the first gaseous reactant thereinto and to discharge the first gaseous reactant into the first vertical conduit at a level below the upper conduit means, and (ii) means extending into the second vertical conduit to conduct the second gaseous reactant thereinto and to discharge the second gaseous reactant into the second vertical conduit at a level below the upper conduit means, the communication means further including a third gas vent connected to and in fluid communication with the upper conduit means to vent gas therefrom.

2. Apparatus according to claim 1, wherein:

the upper conduit means extends horizontally between the first and second vertical conduits; and the lower conduit means extends horizontally between the first and second vertical conduits; and 3. Apparatus according to claim 1, wherein: the means to discharge the first gaseous reactant includes a first gas diffuser located in the first vertical conduit at a level below the upper conduit means; and the means to discharge the second gaseous reactant includes a second gas diffuser located in the second vertical conduit at a level below the upper conduit means.

4. Apparatus according to claim 1, wherein the gas injecting and liquid circulating means further includes
- a propeller rotatably supported in one of the first and second vertical conduits; and
- drive means connected to the propeller to rotate the propeller in said one of the vertical conduits to regulate the rate and direction of flow of the liquid reaction medium and the intermediate liquid mixture.

5. A method for conducting sequential chemical reactions, comprising:
- (a) reacting a first gaseous reactant with a liquid reaction medium in a first reaction zone to form an intermediate liquid mixture therein;
- (b) reacting a second gaseous reactant with the intermediate liquid mixture in a second reaction zone to form a gaseous product therein;
- (c) maintaining the first and second reaction zones in continuous liquid communication, including
  - (1) maintaining a first conduit means in fluid communication with the first and second reaction zones, and
  - (2) maintaining a second conduit means in fluid communication with the first and second reaction zones;
- (d) continuously conducting the liquid reaction medium from the second reaction zone to the first reaction zone through the first conduit means, and continuously conducting the intermediate liquid mixture from the first reaction zone to the second reaction zone through the second conduit means; and
- (e) maintaining the first and second gaseous reactants completely separated during step (d), including
  - (1) venting unreacted first gaseous reactant from the first reaction zone,
  - (2) venting unreacted second gaseous reactant from the second reaction zone, and
  - (3) venting gas from the first conduit means.

6. A method according to claim 5, wherein step (d) includes the steps of:
- conducting the first gaseous reactant into the first reaction zone at a first flow rate; and
- conducting the second gaseous reactant into the second reaction zone at a second flow rate;
- said first flow rate being greater than said second flow rate, the difference in said first and second flow rates forcing the intermediate liquid mixture from the first reaction zone to the second reaction zone through the first conduit means, and forcing the liquid reaction medium from the second reaction zone to the first reaction zone through the second conduit means.

7. A method according to claim 5, wherein:
- the first reaction zone is inside a first vertical conduit;
- the second reaction zone is inside a second vertical conduit;
- the step of maintaining the first conduit means in fluid communication with the first and second reaction zones includes the step of maintaining the first conduit means connected to the first and second vertical conduits; and
- the step of maintaining the second conduit means in fluid communication with the first and second reaction zones includes the step of maintaining the second conduit means connected to the first and second vertical conduits.

* * * * *